US008831764B2

(12) United States Patent
Gates et al.

(10) Patent No.: US 8,831,764 B2
(45) Date of Patent: Sep. 9, 2014

(54) CIGARETTE PACKAGE CODING SYSTEM AND ASSOCIATED METHOD

(75) Inventors: Hugh Gates, Winston-Salem, NC (US); Hung Phan, Clemmons, NC (US); Chris Campbell, Jonesville, NC (US); David Hall, Kernersville, NC (US); Gary Wood, Rural Hall, NC (US); Reggie Thomas, Tobaccoville, NC (US); Frank Brantley, Winston-Salem, NC (US)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 393 days.

(21) Appl. No.: 13/275,016

(22) Filed: Oct. 17, 2011

(65) Prior Publication Data

US 2013/0096711 A1    Apr. 18, 2013

(51) Int. Cl.
  *G06F 19/00* (2011.01)
  *G01N 37/00* (2006.01)
  *A24C 5/32* (2006.01)

(52) U.S. Cl.
  USPC ............ 700/110; 700/112; 702/82; 131/280; 131/282; 131/284

(58) Field of Classification Search
  None
  See application file for complete search history.

(56) References Cited

U.S. PATENT DOCUMENTS

| | | | |
|---|---|---|---|
| 3,288,147 A | | 11/1966 | Molins et al. |
| 3,301,454 A | * | 1/1967 | Wayne et al. ................ 225/2 |
| 3,308,600 A | | 3/1967 | Erdmann et al. |
| 3,366,121 A | | 1/1968 | Carty |
| 3,398,675 A | * | 8/1968 | Potter et al. ................ 100/7 |
| 3,424,172 A | | 1/1969 | Neurath |
| 3,428,049 A | | 2/1969 | Leake et al. |
| 3,444,517 A | | 5/1969 | Rabinow |
| 3,550,508 A | | 12/1970 | Wartman, Jr. |
| 3,550,598 A | | 12/1970 | McGlumphy et al. |

(Continued)

FOREIGN PATENT DOCUMENTS

| | | |
|---|---|---|
| DE | 10238906 | 3/2004 |
| DE | 10 2008 062 370 | 6/2010 |

(Continued)

OTHER PUBLICATIONS

Davis et al., *Tobacco Production, Chemistry and Technology*, 1999, pp. 440-460, Blackwell Science, Inc., Malden, MA.

(Continued)

*Primary Examiner* — Sean Shechtman
(74) *Attorney, Agent, or Firm* — Womble Carlyle Sandridge & Rice, LLP

(57) ABSTRACT

A package coding system for a cigarette manufacturing process is provided. An imprinting device imprints an alphanumeric code on each of a series of cigarette packages. A conveyor device conveys the cigarette packages in a feed direction. An inspection device is operably engaged with the conveyor device and inspects the alphanumeric code imprinted on each cigarette package conveyed by the conveyor device to determine whether any of the cigarette packages includes a defect in the imprinted alphanumeric code, and thus comprises a defective cigarette package. A removal device is operably engaged with the conveyor device and is configured to be in communication with the inspection device. The removal device is configured to remove the defective cigarette package from the series of cigarette packages conveyed by the conveyor device in response to identification thereof by the inspection device. An associated method is also provided.

18 Claims, 5 Drawing Sheets

(56) References Cited

U.S. PATENT DOCUMENTS

| | | | |
|---|---|---|---|
| 3,575,276 A | 4/1971 | Rupert | |
| 3,602,231 A | 8/1971 | Dock | |
| 3,685,521 A | 8/1972 | Dock | |
| 3,818,223 A | 6/1974 | Gibson et al. | |
| 3,884,246 A | 5/1975 | Walker | |
| 3,915,176 A | 10/1975 | Heitmann et al. | |
| 4,053,056 A | 10/1977 | Day | |
| 4,083,460 A | 4/1978 | Venturi | |
| 4,171,739 A * | 10/1979 | Yamato | 198/704 |
| 4,174,719 A | 11/1979 | Martin et al. | |
| 4,238,993 A | 12/1980 | Brand et al. | |
| 4,280,187 A | 7/1981 | Reuland et al. | |
| 4,281,670 A | 8/1981 | Heitmann et al. | |
| 4,281,671 A | 8/1981 | Bynre et al. | |
| 4,284,088 A | 8/1981 | Brand et al. | |
| 4,291,713 A | 9/1981 | Frank | |
| 4,294,353 A | 10/1981 | Focke et al. | |
| RE30,964 E * | 6/1982 | Butner et al. | 209/536 |
| 4,403,620 A * | 9/1983 | Joseph et al. | 131/280 |
| 4,445,520 A | 5/1984 | Knight et al. | |
| 4,474,190 A | 10/1984 | Brand | |
| 4,534,463 A | 8/1985 | Bouchard | |
| 4,574,816 A | 3/1986 | Rudszinat | |
| 4,715,497 A | 12/1987 | Focke et al. | |
| 4,736,754 A | 4/1988 | Heitmann et al. | |
| 4,781,203 A | 11/1988 | La Hue | |
| 4,807,809 A | 2/1989 | Pryor et al. | |
| 4,811,745 A | 3/1989 | Cohen et al. | |
| 4,844,100 A | 7/1989 | Holznagel | |
| 4,850,301 A | 7/1989 | Greene, Jr. et al. | |
| 4,852,734 A | 8/1989 | Allen et al. | |
| 4,862,905 A | 9/1989 | Green, Jr. et al. | |
| 4,878,506 A | 11/1989 | Pinck et al. | |
| 4,889,144 A | 12/1989 | Tateno et al. | |
| 4,920,990 A | 5/1990 | Lawrence et al. | |
| 4,925,602 A | 5/1990 | Hill et al. | |
| 5,012,823 A | 5/1991 | Keritsis et al. | |
| 5,012,829 A | 5/1991 | Thesing et al. | |
| 5,025,814 A | 6/1991 | Raker | |
| 5,060,664 A | 10/1991 | Siems et al. | |
| 5,060,665 A | 10/1991 | Heitmann | |
| 5,074,320 A | 12/1991 | Jones, Jr. et al. | |
| 5,101,609 A * | 4/1992 | Cook | 53/53 |
| 5,101,839 A | 4/1992 | Jakob et al. | |
| 5,105,838 A | 4/1992 | White et al. | |
| 5,131,416 A | 7/1992 | Gentry | |
| 5,139,140 A | 8/1992 | Burrows et al. | |
| 5,156,169 A | 10/1992 | Holmes et al. | |
| 5,159,944 A | 11/1992 | Arzonico et al. | |
| 5,167,244 A | 12/1992 | Kjerstad | |
| 5,191,906 A | 3/1993 | Myracle, Jr. | |
| 5,220,930 A | 6/1993 | Gentry | |
| 5,225,277 A | 7/1993 | Takegawa et al. | |
| 5,240,117 A | 8/1993 | Focke et al. | |
| 5,271,419 A | 12/1993 | Arzonico et al. | |
| 5,333,729 A | 8/1994 | Wolfe | |
| 5,353,357 A | 10/1994 | Longest et al. | |
| 5,360,023 A | 11/1994 | Blakley et al. | |
| 5,387,285 A | 2/1995 | Rivers | |
| 5,396,909 A | 3/1995 | Gentry et al. | |
| 5,432,600 A | 7/1995 | Grollimund et al. | |
| 5,472,002 A | 12/1995 | Covarrubias | |
| 5,476,108 A | 12/1995 | Dominguez et al. | |
| 5,515,159 A * | 5/1996 | Sites et al. | 356/237.1 |
| 5,660,382 A * | 8/1997 | Meier | 270/52.16 |
| 5,718,250 A | 2/1998 | Banerjee et al. | |
| 5,740,902 A * | 4/1998 | Spatafora | 198/459.2 |
| 5,898,104 A | 4/1999 | Rohrssen et al. | |
| 5,938,018 A | 8/1999 | Keaveney et al. | |
| 5,977,780 A | 11/1999 | Herrmann | |
| 6,020,969 A | 2/2000 | Struckhoff et al. | |
| 6,054,665 A | 4/2000 | Focke et al. | |
| 6,117,455 A | 9/2000 | Takada et al. | |
| 6,158,193 A | 12/2000 | Focke et al. | |
| 6,213,128 B1 | 4/2001 | Smith et al. | |
| 6,229,115 B1 | 5/2001 | Voss et al. | |
| 6,246,778 B1 * | 6/2001 | Moore | 382/103 |
| 6,360,751 B1 | 3/2002 | Fagg et al. | |
| 6,384,359 B1 | 5/2002 | Belcastro et al. | |
| 6,385,333 B1 | 5/2002 | Puckett et al. | |
| 6,537,186 B1 | 3/2003 | Veluz | |
| 6,612,429 B2 | 9/2003 | Dennen | |
| 6,647,878 B2 | 11/2003 | Blau et al. | |
| 6,726,006 B1 | 4/2004 | Funderburk et al. | |
| 6,736,261 B1 | 5/2004 | Thomas et al. | |
| 6,761,174 B2 | 7/2004 | Jupe et al. | |
| 6,779,530 B2 | 8/2004 | Kraker | |
| 6,813,961 B2 | 11/2004 | Stiller et al. | |
| 6,848,449 B2 | 2/2005 | Kitao et al. | |
| 6,904,917 B2 | 6/2005 | Kitao et al. | |
| 7,074,170 B2 | 7/2006 | Lanier, Jr. et al. | |
| 7,115,085 B2 | 10/2006 | Deal | |
| 7,210,486 B2 | 5/2007 | Hartmann | |
| 7,234,471 B2 | 6/2007 | Fitzgerald et al. | |
| 7,237,559 B2 | 7/2007 | Ashcraft et al. | |
| 7,240,678 B2 | 7/2007 | Crooks et al. | |
| 7,275,548 B2 | 10/2007 | Hancock et al. | |
| 7,281,540 B2 | 10/2007 | Barnes et al. | |
| 7,296,578 B2 | 11/2007 | Read, Jr. | |
| 7,325,382 B2 | 2/2008 | Nelson et al. | |
| 7,434,585 B2 | 10/2008 | Holmes | |
| 7,479,098 B2 | 1/2009 | Thomas et al. | |
| 7,565,818 B2 | 7/2009 | Thomas et al. | |
| 7,578,298 B2 | 8/2009 | Karles et al. | |
| 7,654,945 B2 | 2/2010 | Deal | |
| 7,740,019 B2 | 6/2010 | Nelson et al. | |
| 7,744,922 B2 | 6/2010 | Mane et al. | |
| 7,784,356 B2 | 8/2010 | Spiers et al. | |
| 7,833,146 B2 | 11/2010 | Deal | |
| 7,836,895 B2 | 11/2010 | Dube et al. | |
| 7,861,728 B2 | 1/2011 | Holton, Jr. et al. | |
| 7,972,254 B2 | 7/2011 | Stokes et al. | |
| 8,142,339 B2 | 3/2012 | Deal | |
| 8,186,359 B2 | 5/2012 | Ademe et al. | |
| 8,262,550 B2 | 9/2012 | Barnes et al. | |
| 8,308,623 B2 | 11/2012 | Nelson et al. | |
| 2001/0032932 A1 | 10/2001 | Focke et al. | |
| 2002/0185141 A1 | 12/2002 | Heide | |
| 2003/0136419 A1 | 7/2003 | Muller | |
| 2003/0137312 A1 | 7/2003 | Cerati et al. | |
| 2003/0145866 A1 | 8/2003 | Hartmann | |
| 2003/0178036 A1 | 9/2003 | Demmer et al. | |
| 2003/0206023 A1 | 11/2003 | Herrmann | |
| 2004/0129281 A1 | 7/2004 | Hancock et al. | |
| 2004/0141174 A1 | 7/2004 | Focke et al. | |
| 2004/0217023 A1 | 11/2004 | Fagg et al. | |
| 2004/0256253 A1 | 12/2004 | Henson et al. | |
| 2004/0261807 A1 | 12/2004 | Dube et al. | |
| 2005/0016556 A1 | 1/2005 | Ashcraft et al. | |
| 2005/0039764 A1 | 2/2005 | Barnes et al. | |
| 2005/0066986 A1 | 3/2005 | Nestor et al. | |
| 2005/0075754 A1 * | 4/2005 | Zeitler et al. | 700/230 |
| 2005/0076929 A1 | 4/2005 | Fitzgerald et al. | |
| 2005/0112228 A1 | 5/2005 | Smith et al. | |
| 2005/0150786 A1 | 7/2005 | Mitten et al. | |
| 2006/0169295 A1 | 8/2006 | Draghetti | |
| 2006/0207616 A1 | 9/2006 | Hapke et al. | |
| 2006/0243611 A1 | 11/2006 | Wu | |
| 2006/0272655 A1 | 12/2006 | Thomas et al. | |
| 2007/0056600 A1 | 3/2007 | Coleman, III et al. | |
| 2007/0102015 A1 | 5/2007 | Villarinho | |
| 2007/0144542 A1 * | 6/2007 | Bencivenni et al. | 131/58 |
| 2007/0215167 A1 | 9/2007 | Crooks et al. | |
| 2007/0246055 A1 | 10/2007 | Oglesby | |
| 2008/0093234 A1 | 4/2008 | Jones et al. | |
| 2008/0099353 A1 | 5/2008 | Parsons et al. | |
| 2008/0142028 A1 | 6/2008 | Fagg | |
| 2008/0179204 A1 | 7/2008 | Lutzig | |
| 2008/0202540 A1 * | 8/2008 | Carter et al. | 131/336 |
| 2009/0050163 A1 | 2/2009 | Hartmann et al. | |
| 2009/0066948 A1 | 3/2009 | Karpowicz et al. | |
| 2009/0090372 A1 | 4/2009 | Thomas et al. | |
| 2009/0120449 A1 | 5/2009 | Tindall | |
| 2010/0059074 A1 | 3/2010 | Brantley et al. | |

(56) References Cited

U.S. PATENT DOCUMENTS

| | | | |
|---|---|---|---|
| 2010/0101589 A1 | 4/2010 | Nelson et al. |
| 2010/0184576 A1 | 7/2010 | Prestia et al. |
| 2010/0236561 A1 | 9/2010 | Barnes et al. |
| 2010/0293106 A1 | 11/2010 | Rhoads et al. |
| 2010/0294290 A1 | 11/2010 | Zhang |
| 2011/0053745 A1 | 3/2011 | Iliev et al. |
| 2011/0067976 A1* | 3/2011 | Pelagatti .................. 198/431 |
| 2011/0162662 A1 | 7/2011 | Nikolov et al. |
| 2011/0162665 A1 | 7/2011 | Burov et al. |
| 2011/0169942 A1 | 7/2011 | Brantley et al. |
| 2011/0230320 A1 | 9/2011 | Stokes et al. |
| 2011/0271968 A1 | 11/2011 | Carpenter et al. |
| 2012/0037546 A1 | 2/2012 | Dixon et al. |
| 2012/0055493 A1 | 3/2012 | Novak, III et al. |
| 2012/0077658 A1 | 3/2012 | Nikolov et al. |
| 2012/0080043 A1 | 4/2012 | Naenen et al. |
| 2012/0120229 A1 | 5/2012 | Brantley et al. |
| 2012/0245006 A1 | 9/2012 | Henley et al. |
| 2012/0245007 A1 | 9/2012 | Henley et al. |

FOREIGN PATENT DOCUMENTS

| | | | |
|---|---|---|---|
| EP | 0 292 949 A2 | 11/1988 |
| EP | 0 704 172 | 4/1996 |
| EP | 1 669 755 | 6/2006 |
| EP | 1 754 419 A1 | 2/2007 |
| EP | 1 767 107 | 3/2007 |
| EP | 1 916 188 | 4/2008 |
| EP | 2 243 384 A1 | 10/2010 |
| GB | 1058343 A2 | 2/1967 |
| GB | 2 020 158 | 11/1979 |
| GB | 1042000 | 9/1996 |
| JP | 9325123 | 12/1997 |
| JP | 2001-190262 | 7/2001 |
| JP | 2003-219855 | 8/2003 |
| JP | 2004-504825 | 2/2004 |
| WO | WO 01/79092 | 10/2001 |
| WO | WO 03/009711 | 2/2003 |
| WO | WO 03/047836 | 6/2003 |
| WO | WO 03/082558 | 10/2003 |
| WO | WO 2005/113386 | 12/2005 |
| WO | WO 2006/064371 | 6/2006 |
| WO | WO 2006/092962 | 9/2006 |
| WO | WO 2007/028957 | 3/2007 |
| WO | WO 2007/038053 | 4/2007 |

OTHER PUBLICATIONS

Johnson, *Development of Cigarette Components to Meet Industry Needs*, 52$^{nd}$ T.S.R.C., Sep. 1998.

* cited by examiner

CIGARETTE PACKAGE CODING SYSTEM AND ASSOCIATED METHOD

BACKGROUND OF THE DISCLOSURE

1. Field of the Disclosure

Aspects of the present disclosure relate to a cigarette manufacturing process and, more particularly, to a cigarette package coding system and associated method.

2. Description of Related Art

Many mass-produced products are required to incorporate various coding schemes, for example, for regulatory purposes or for commercial tracking. Often, such coding must be marked directly on the product and/or on the package containing the product, and the accuracy and repeatability of the application of such coding is generally of high importance in forming a commercializable product. That is, if the coding is not applied in a particular manner, the product may be deemed to be "defective" and not suitable for sale. Accordingly, in a high speed manufacturing process, the application of the coding to the products/packages must be accomplished in an accurate and repeatable manner, and desirably at a high throughput speed.

However, such printing of the code on the product(s) in a high speed manufacturing process may be at risk of, for example, low print quality, uneven printing, misalignment of the code, a substantive error in the code (i.e., the wrong code), or other condition(s) deemed to comprise a defect. In such instances, it may be critical for such defects to be detected, wherein such defects may desirably be both qualitative as well as substantive, and for the product with the defectively-printed code to be removed from the manufacturing process, as soon as possible after the code is printed on the product, before the defective product can be further processed. It may also be desirable for the defective product to be removed from the manufacturing process without disturbing or affecting other non-defective products, and for the process to compensate or adjust for the absence of the defective product, once removed. It may also be desirable to have the capability of analyzing the defects, as well as patterns or trends in the defects, detected during the manufacturing process so as to, for example, allow root causes and remedial action to be determined, or to halt the process before too many defective products are produced. It may also be desirable for such a system and method to be installed in new manufacturing processes, or retrofitted into existing manufacturing processes, in a relatively simple and straightforward arrangement and configuration.

SUMMARY OF THE DISCLOSURE

The above and other needs are addressed by aspects of the present disclosure which, according to one particular aspect, provides a package coding system implemented in a cigarette manufacturing process. Such a system comprises an imprinting device configured to imprint an alphanumeric code on each of a series of cigarette packages. A conveyor device is configured to convey the cigarette packages in a feed direction. An inspection device is operably engaged with the conveyor device, and is configured to inspect the alphanumeric code imprinted on each cigarette package conveyed by the conveyor device to determine whether any of the cigarette packages includes a defect in the imprinted alphanumeric code, wherein any of the cigarette packages including the defect comprises a defective cigarette package. A removal device is operably engaged with the conveyor device and is configured to be in communication with the inspection device. The removal device is further configured to remove the defective cigarette package from the series of cigarette packages conveyed by the conveyor device in response to identification thereof by the inspection device, in some instances, without interacting with the cigarette packages preceding and subsequent to the defective cigarette package in the series of cigarette packages.

Another aspect of the present disclosure is directed to a method of verifying package coding in a cigarette manufacturing process. Such a method comprises imprinting an alphanumeric code on each of a series of cigarette packages, using an imprinting device, and conveying the cigarette packages in a feed direction using a conveyor device. The alphanumeric code imprinted on each cigarette package conveyed by the conveyor device is then inspected, using an inspection device operably engaged therewith, to determine whether any of the cigarette packages includes a defect in the imprinted alphanumeric code, wherein any of the cigarette packages including the defect comprises a defective cigarette package. The defective cigarette package is then removed from the series of cigarette packages conveyed by the conveyor device, using a removal device operably engaged with the conveyor device and configured to be in communication with the inspection device, in response to identification thereof by the inspection device, in some instances, without interacting with the cigarette packages preceding and subsequent to the defective cigarette package in the series of cigarette packages.

The above and other aspects thus address the identified needs and provide advantages as otherwise detailed herein.

BRIEF DESCRIPTION OF THE DRAWINGS

Figure 1:
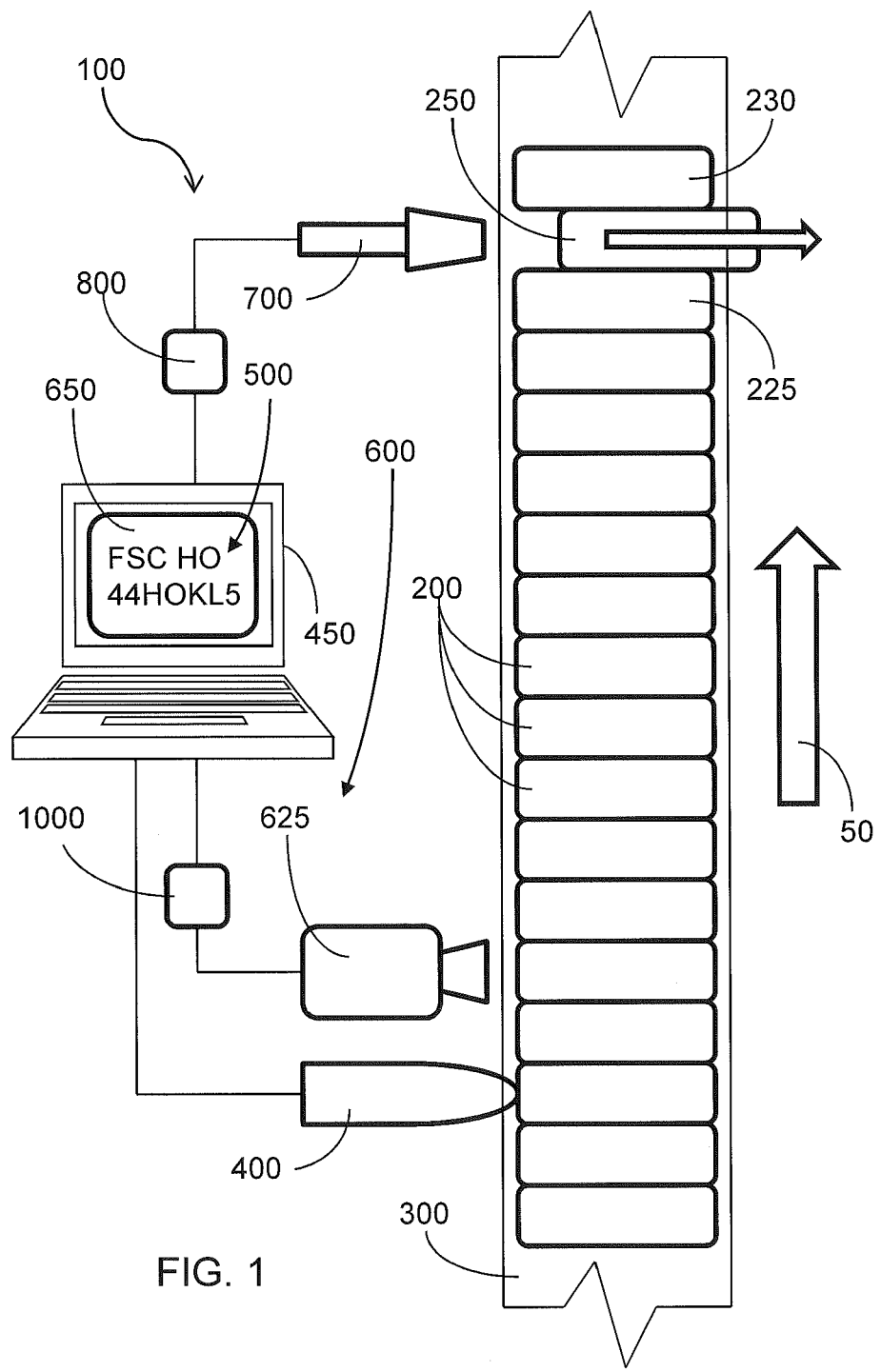
Figure 2:
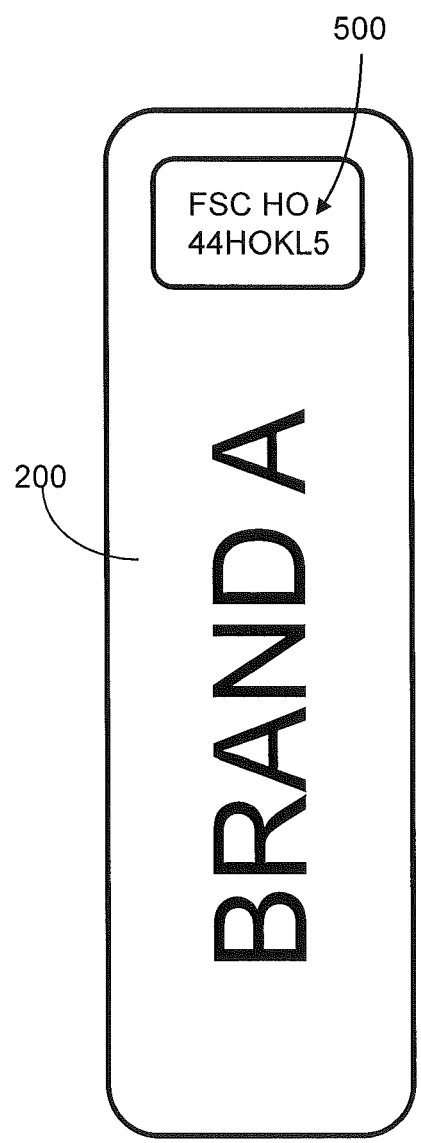
Figure 3:
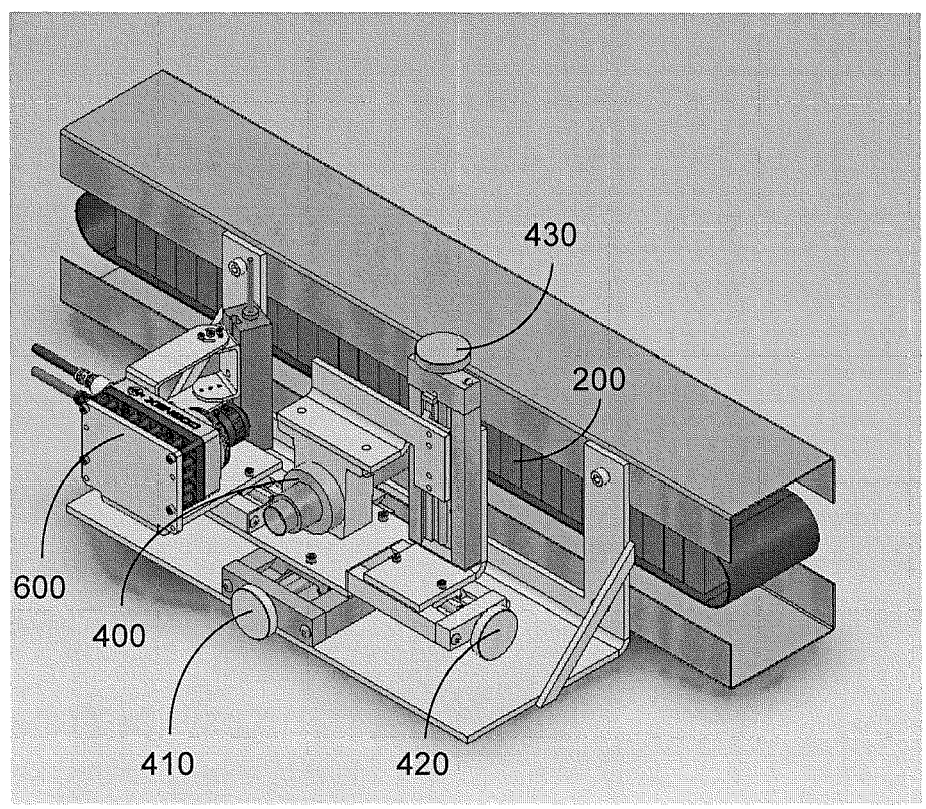
Figure 4:
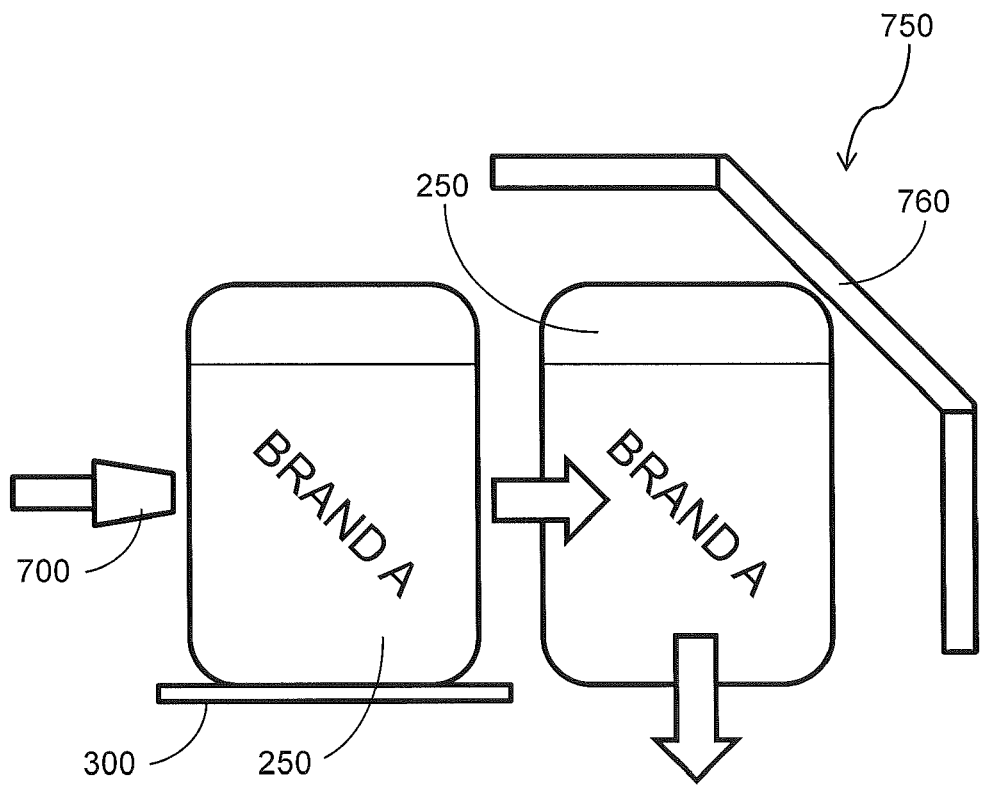
Figure 4:
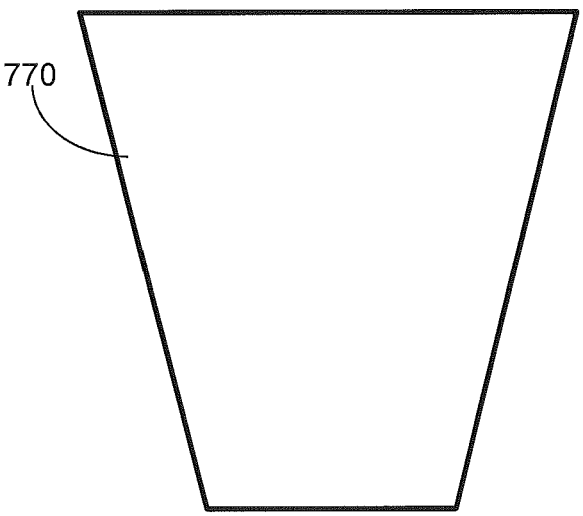
Figure 5:
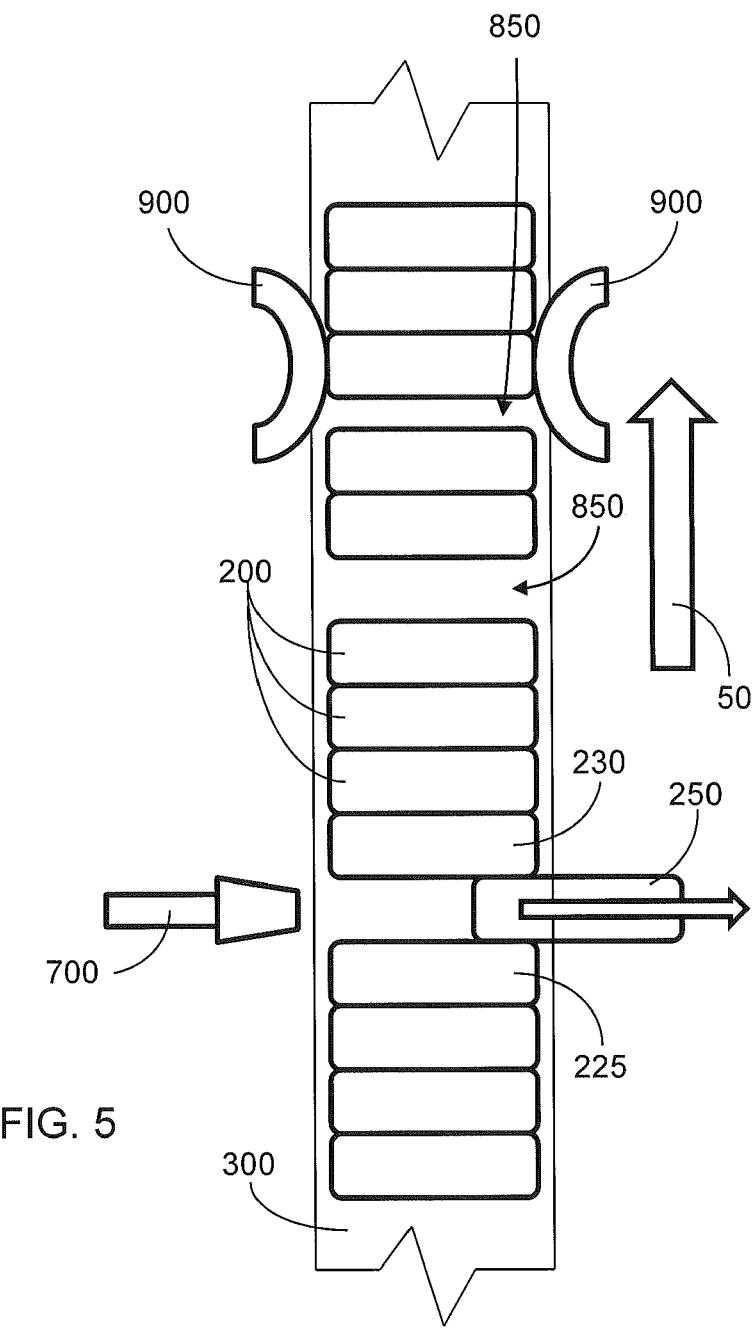

Having thus described the disclosure in general terms, reference will now be made to the accompanying drawings, which are not necessarily drawn to scale, and wherein:

FIG. 1 is a schematic plan view of a package coding system in a cigarette manufacturing process, according to one aspect of the present disclosure;

FIG. 2 is a schematic of an exemplary cigarette package illustrating package coding, according to one aspect of the present disclosure;

FIG. 3 is a schematic of an imprinting device and an inspection device implemented in a package coding system of a cigarette manufacturing process, according to one aspect of the present disclosure;

FIG. 4 is a schematic of a removal device for a defective cigarette package, as implemented in a package coding system of a cigarette manufacturing process, according to one aspect of the present disclosure; and FIG. 5 is a schematic plan view of a removal device for a defective cigarette package, and an associated handling device, as implemented in a package coding system of a cigarette manufacturing process, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

FIG. 1 schematically illustrates a package coding system implemented in a cigarette manufacturing process, according to one aspect of the present disclosure, the system being generally indicated by the numeral 100. Such a cigarette manufacturing process often includes the transport or conveyance of multiple cigarette packages 200, by a conveyor device 300, in a feed direction 50, wherein each cigarette package may be a "soft pack" or a hard carton, and includes a plurality of cigarette smoking articles packaged therein. In so conveying the cigarette packages 200, a series of such cigarette packages 200 is defined, wherein the packages are all arranged in a particular orientation and are disposed adjacent to each other. That is, any selected cigarette package in the series will have a preceding cigarette package and a subsequent cigarette package disposed adjacent thereto, with no spacing therebetween, in the feed direction 50.

In particular aspects, the present disclosure may include an imprinting device 400 configured to imprint an alphanumeric code 500 on each of a series of cigarette packages 200 (see, e.g., FIG. 2). The alphanumeric code 500 may comprise, for example, a brand, a date, a lot number, a filter type, a tobacco rod type, a serial number, or any other type of code as necessary or desired. The imprinting device 400 may comprise, for example, an inkjet printing device, a laser printing device, a thermal printing device, or any other suitable type of printing device as necessary or desired. In one particular instance, such an imprinting device 400 may comprise, for example, a Model VideoJet UHS or 178I printing device manufactured by Videojet Technologies Inc. of Wood Dale, Ill. In some aspects, the imprinting device 400 may comprise or otherwise be in communication with a computer device 450 for communicating the alphanumeric code 500 to the imprinting device 400 for imprinting thereof on one or more of the cigarette packages 200 in the series.

An inspection device 600 may be operably engaged with the conveyor device 300, downstream in the feed direction with respect to the imprinting device 400, and configured to inspect the alphanumeric code 500 imprinted on each cigarette package 200 conveyed by the conveyor device 300 to determine whether any of the cigarette packages 200 includes a defect in the imprinted alphanumeric code 500. Any such cigarette packages including the defect may comprise, for example, a defective cigarette package 250. Such a defect in the imprinted alphanumeric code 500 may comprise, for example, low print quality, uneven printing, misalignment of the alphanumeric code 500, a substantive error in the alphanumeric code (i.e., the wrong code), or other condition deemed to comprise a defect. In some instances, the inspection device 600 may be disposed in proximity (and downstream in the feed direction) to the imprinting device 400. In other instances, the inspection device 600 and/or the imprinting device 400 may be adjustably supported and mounted so as to allow each component to be suitably aligned with the series of cigarette packages 200 to perform the respective functions. For example, the inspection device 600 and/or the imprinting device 400 may be supported and mounted so as to have adjustability along an x-, y-, and/or z-axis (shown, for example, in FIG. 3, as elements 410, 420, and 430, respectively, for the imprinting device 400) so as to be capable of being positioned, as necessary or desired to accomplish the functions of the package coding system 100 according to the present disclosure.

In some aspects of the disclosure, the inspection device 600 may be configured to execute an image processing procedure to analyze an image 650 of the imprinted alphanumeric code 500 on each of the cigarette packages 200 to determine whether any of the cigarette packages 200 includes the defect. Accordingly, the inspection device 600 may comprise or otherwise include an image capturing device 625 such as, for example, a digital camera or video imaging device. Further, the inspection device 600 may comprise or otherwise be in communication with a computer device, such as the computer device 450, wherein the computer device 450 may be configured to analyze the image(s) 650 captured by the image capturing device 625, using an image processing procedure. In some aspects, the image processing procedure may be configured to analyze, for example, a location of the imprinted alphanumeric code 500 on each of the cigarette packages 200 (as reflected in the images thereof), a print quality of the imprinted alphanumeric code 500 on each of the cigarette packages 200, and a substantive content of the imprinted alphanumeric code 500 on each of the cigarette packages 200. In other aspects, the inspection device 600 and/or image processing procedure may comprise or otherwise be configured to implement a machine vision system. Such a machine vision system may be available as a Model RJR Vision One [Cognex 5600] machine vision system manufactured by Integro of Salisbury, N.C. In some aspects, the inspection device 600 may thus be configured to determine, for example, based upon parameters pre-programmed by an operator or otherwise established in connection with the cigarette manufacturing process, whether the examined alphanumeric code 500 on any of the cigarette packages conveyed by the conveyor device 300 includes a defined defect. Further, in some instances, an image of the alphanumeric code imprinted on each of the cigarette packages in the series may be displayed on a display, while being analyzed by the inspection device 600 and/or during the image processing procedure, in a manner such that the evaluation can be monitored by an operator. For instance, the image of the alphanumeric code on the display may be overlaid with objective criteria (i.e., location, font, print quality, substantive content) to which the code is being compared, in order to provide for manual monitoring of the evaluation.

In the event that a defect is determined (i.e., a defective cigarette package 250 is determined based upon the examination and evaluation of the alphanumeric code 500 thereon by the inspection device 600), the package coding system 100 may further include a removal device 700 operably engaged with the conveyor device 300, downstream in the feed direction with respect to the inspection device 600, and configured to be in communication with the inspection device 600. In such instances, the removal device 700 may be further configured to remove the defective cigarette package 250, as determined by the inspection device 600, from the series of cigarette packages 200 conveyed by the conveyor device 300, in response to identification of the defective cigarette package 250 by the inspection device 600. That is, in some aspects, the inspection device 600 may be configured to identify the defective cigarette package 250 in the series of cigarette packages conveyed by the conveyor device 300, and to direct the removal device 700 (i.e., via the computer device 450) to interact with the defective cigarette package 250, when the defective cigarette package is in registration therewith, to remove the defective cigarette package 250 from the series of cigarette packages conveyed by the conveyor device 300. In particular instances, the removal device 700 may be configured, for example, to direct a pressurized air charge substantially perpendicularly to the feed direction of the conveyor device 300. In such instances, the pressurized air charge may be configured to interact with the defective cigarette package 250, so as to direct the defective cigarette package 250 out of the series of cigarette packages, without interacting with the cigarette packages preceding 225 and subsequent to 230 the defective cigarette package 250 in the series of cigarette packages. For example, a sufficient air charge at a suitably high pressure, released by the removal device 700 and directed toward the defective cigarette package 250 when the defective cigarette package 250 is in registration therewith, may be configured to urge the defective cigarette package 250 out of the series of cigarette packages without disturbing or otherwise affecting the adjacent cigarette packages 225, 230 in the series (see, e.g., FIGS. 1 and 5).

In accomplishing the tracking of the defective cigarette package 250 conveyed by the conveyor device 300 between the inspection device 600 and the removal device 700, a synchronization device 800 may be operably engaged with the inspection device 600, the conveyor device 300, the removal device 700, and the computer device 450 (see, e.g., FIG. 1). Such a synchronization device 800 may be configured, for instance, to determine a position of the defective cigarette package 250 conveyed by the conveyor device 300, in response to the determination thereof by the inspection device 600, and to communicate the position to the removal device 700, so as to notify the removal device 700 of when the defective cigarette package 250 is in registration therewith. For example, the number of cigarette packages disposed between the inspection device 600 and the removal device 700 may be known. As such, upon determination of a defective cigarette package by the inspection device 600, the synchronization device 800 may be configured to notify the removal device 700 to remove the defective cigarette package 250 once the known number of packages has been conveyed past the removal device 700. One skilled in the art will appreciate, however, that the synchronization device 800 may be configured in many different manners, as necessary or desired.

In some aspects, the package coding system 100 may also include a collection device 750, as shown, for example, in FIG. 4, operably engaged with the removal device 700 and the conveyor device 300, and configured to collect the defective cigarette package 250 removed from the series of cigarette packages conveyed by the conveyor device 300. For example, the collection device 750 may comprise a deflector 760 configured to translate the lateral motion of the defective cigarette package 250 to a vertical motion, wherein a receptacle 770 may be disposed vertically adjacent to the deflector 760 to collect the defective cigarette packages 200 for disposal or rework.

In so removing the defective cigarette package(s) 200 from the series being conveyed by the conveyor 300, using the pressurized air charge delivered by the removal device 700, an open space 850 may remain in the series for each such removal (see, e.g., FIG. 5). Accordingly, in some instances, the package coding system 100 may further include a handling device 900 operably engaged with the conveyor device 300 downstream of the removal device 700. The handling device 900 may be configured, for example, to manipulate the series of cigarette packages so as to eliminate the open space therein due to removal of the defective cigarette package 250 by the removal device 700. For instance, such a handling device 900 may comprise a friction device configured and disposed to interact with the cigarette packages being conveyed by the conveyor device 300, wherein the friction device would retain a cigarette package (such that the cigarette package remains stationary while the conveyor device 300 continues to move in the feed direction 50) until dislodged by subsequent cigarette packages in the series. That is, the friction device may be configured to retain a cigarette package until it is dislodged by subsequent cigarette packages conveyed by the conveyor device 300, once the open space 850 caused by the removal of a defective cigarette package 250 is eliminated.

Since, some aspects of the package coding system 100 are directed toward determining defective products in a manufacturing process, it may be necessary or desirable to have the capability of eliminating or otherwise minimizing the occurrence of such defects in order to increase the final production yield. As such, in some instances, the package coding system 100 may also include an analysis device 1000 (see, e.g., FIG. 1) operably engaged with the inspection device 700 and/or the computer device 450, wherein the analysis device 1000 may be configured to analyze the defective cigarette package(s) 200 determined by the inspection device 700, so as to further determine, for example, a defect type associated with the defect and/or a cause of the defect. For example, the defect type may be incorrect substantive content caused by operator input error. In other instances, the defect type may be substandard print quality caused by a low ink level at a print head or a malfunctioning print head associated with the imprinting device 400. In a further example, the defect may comprise an unacceptable location of the alphanumeric code on the cigarette package due to misalignment of the imprinting device 400. Accordingly, the analysis device 1000 may be suitably configured to determine the type or class of the detected defects, ascertain the root cause leading to the defect, and allow the root cause to be addressed, before further defects are realized within the series of cigarette packages. In another aspect, it may be desirable for the inspection device 600 and/or the analysis device 1000 to determine patterns or trends in the detected defects, and to pause or halt the manufacturing process (i.e., to allow the cause of the defects to be corrected) when too many of the defects are detected or if the defects are detected too frequently, so as to minimize or otherwise prevent too many of the products from being deemed to be defective and thereby undesirably lowering process throughput.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A package coding system implemented in a cigarette manufacturing process, said system comprising:
   an imprinting device configured to imprint an alphanumeric code on each of a series of cigarette packages;
   a conveyor device configured to convey the cigarette packages, adjacent to and unspaced with respect to each other to form a continuous series and in a feed direction;
   an inspection device operably engaged with the conveyor device and configured to inspect the alphanumeric code imprinted on each cigarette package in the continuous series thereof conveyed by the conveyor device to determine whether any of the cigarette packages includes a defect in the imprinted alphanumeric code, any of the cigarette packages including the defect being a defective cigarette package;
   a removal device operably engaged with the conveyor device and configured to be in communication with the inspection device, the removal device being further configured to remove the defective cigarette package from the continuous series of cigarette packages conveyed by the conveyor device in response to identification thereof by the inspection device; and a synchronization device operably engaged with the inspection device, the conveyor device, and the removal device, the synchronization device being configured to determine a position of the defective cigarette package in the continuous series of cigarette packages conveyed by the conveyor device, in response to the determination thereof by the inspection device, and to communicate the position of the defective cigarette package in the continuous series to the removal device so as to notify the removal device of the defective cigarette package being in registration therewith for removal of the defective cigarette package from the continuous series.

2. A system according to claim 1, wherein the inspection device is configured to identify the defective cigarette package in the continuous series of cigarette packages conveyed by the conveyor device, and to direct the removal device to interact with the defective cigarette package, when the defective cigarette package is in registration therewith, to remove the defective cigarette package from the continuous series of cigarette packages conveyed by the conveyor device.

3. A system according to claim 1, wherein the removal device is configured to direct a pressurized air charge substantially perpendicularly to the feed direction of the conveyor device, the pressurized air charge being configured to interact with the defective cigarette package, so as to direct the defective cigarette package out of the continuous series of cigarette packages, without interacting with the cigarette packages preceding and subsequent to the defective cigarette package, and adjacent to and unspaced therewith, in the continuous series of cigarette packages.

4. A system according to claim 3, further comprising a collection device operably engaged with the removal device and the conveyor device and configured to collect the defective cigarette package removed from the continuous series of cigarette packages.

5. A system according to claim 1, wherein the inspection device is configured to execute an image processing procedure to analyze an image of the imprinted alphanumeric code on each of the cigarette packages to determine whether any of the cigarette packages includes the defect.

6. A system according to claim 5, wherein the image processing procedure is configured to analyze one of a location of the imprinted alphanumeric code on each of the cigarette packages, a print quality of the imprinted alphanumeric code on each of the cigarette packages, and a substantive content of the imprinted alphanumeric code on each of the cigarette packages.

7. A system according to claim 1, wherein the inspection device further comprises a machine vision system.

8. A system according to claim 1, further comprising an analysis device operably engaged with the inspection device, the analysis device being configured to analyze the defective cigarette packages determined by the inspection device to determine one of a defect type associated with the defect and a cause of the defect.

9. A system according to claim 1, further comprising a handling device operably engaged with the conveyor device downstream of the removal device, the handling device being configured to manipulate the cigarette packages remaining on the conveyor device downstream of the removal device so as to eliminate any open spaces therebetween due to removal of defective cigarette packages from the continuous series by the removal device.

10. A method of verifying package coding in a cigarette manufacturing process, said method comprising:

imprinting an alphanumeric code on each of a series of cigarette packages using an imprinting device;

conveying the cigarette packages, adjacent to and unspaced with respect to each other to form a continuous series and in a feed direction, using a conveyor device;

inspecting the alphanumeric code imprinted on each cigarette package in the continuous series thereof conveyed by the conveyor device, using an inspection device operably engaged therewith, to determine whether any of the cigarette packages includes a defect in the imprinted alphanumeric code, any of the cigarette packages including the defect being a defective cigarette package;

removing the defective cigarette package from the continuous series of cigarette packages conveyed by the conveyor device, using a removal device operably engaged with the conveyor device and configured to be in communication with the inspection device, in response to identification thereof by the inspection device; and determining a position of the defective cigarette package in the continuous series of cigarette packages conveyed by the conveyor device, in response to the determination thereof by the inspection device, using a synchronization device operably engaged with the inspection device, the conveyor device, and the removal device, and communicating the position of the defective cigarette package in the continuous series to the removal device so as to notify the removal device of the defective cigarette package being in registration therewith for removal of the defective cigarette package from the continuous series.

11. A method according to claim 10, further comprising identifying the defective cigarette package in the continuous series of cigarette packages conveyed by the conveyor device, with the inspection device, and directing the removal device to interact with the defective cigarette package, when the defective cigarette package is in registration therewith, to remove the defective cigarette package from the continuous series of cigarette packages conveyed by the conveyor device.

12. A method according to claim 10, further comprising directing a pressurized air charge substantially perpendicularly to the feed direction of the conveyor device, with the removal device, the pressurized air charge being configured to interact with the defective cigarette package, so as to direct the defective cigarette package out of the continuous series of cigarette packages, without interacting with the cigarette packages preceding and subsequent to the defective cigarette package, and adjacent to and unspaced therewith, in the continuous series of cigarette packages.

13. A method according to claim 12, further comprising collecting the defective cigarette package removed from the continuous series of cigarette packages using a collection device operably engaged with the removal device and the conveyor device.

14. A method according to claim 10, further comprising executing an image processing procedure, in association with the inspection device, to analyze an image of the imprinted alphanumeric code on each of the cigarette packages to determine whether any of the cigarette packages includes the defect.

15. A method according to claim 14, wherein executing an image processing procedure further comprises analyzing one of a location of the imprinted alphanumeric code on each of the cigarette packages, a print quality of the imprinted alphanumeric code on each of the cigarette packages, and a substantive content of the imprinted alphanumeric code on each of the cigarette packages.

16. A method according to claim 10, wherein inspecting the alphanumeric code further comprises inspecting the alphanumeric code imprinted on each cigarette package, using an inspection device comprising a machine vision system.

17. A method according to claim 10, further comprising analyzing the defective cigarette packages determined by the inspection device, using an analysis device operably engaged with the inspection device, to determine one of a defect type associated with the defect and a cause of the defect.

18. A method according to claim 10, further comprising manipulating the cigarette packages remaining on the conveyor device downstream of the removal device, using a handling device operably engaged with the conveyor device downstream of the removal device, so as to eliminate any open spaces therebetween due to removal of defective cigarette packages from the continuous series by the removal device.

\* \* \* \* \*